July 30, 1935.  A. B. BRUSSE ET AL  2,009,647
WELDING APPARATUS
Filed Sept. 18, 1934
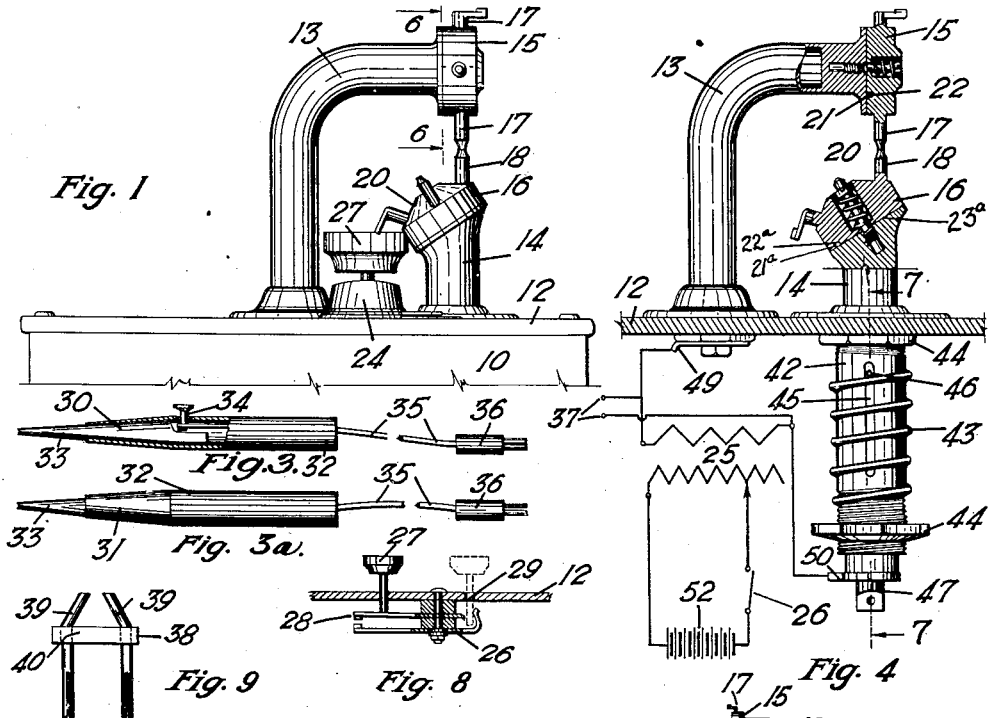
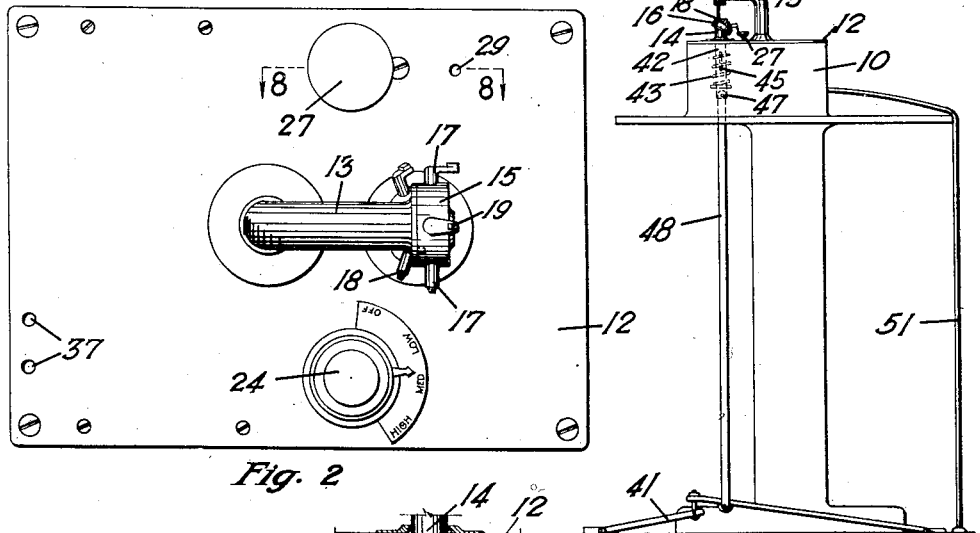
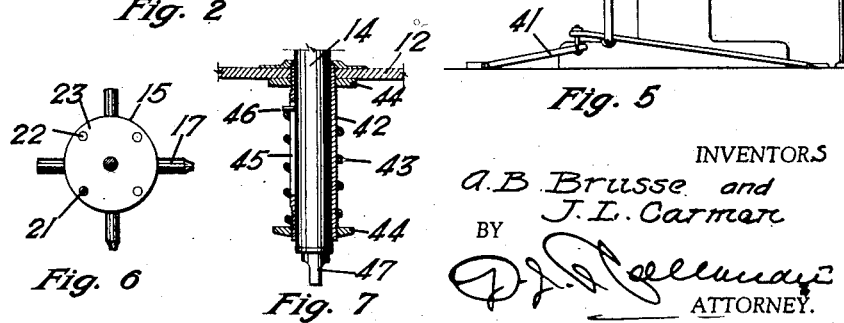
INVENTORS
A. B. Brusse and
J. L. Carman
BY
ATTORNEY.

Patented July 30, 1935

2,009,647

UNITED STATES PATENT OFFICE 2,009,647

WELDING APPARATUS

Archie Bryan Brusse and Joseph L. Carman, Denver, Colo., assignors, by mesne assignments, to Rocky Mountain Metal Products Co., Denver, Colo., a corporation of Colorado Application September 18, 1934, Serial No. 744,548

15 Claims. (Cl. 219—4)

Our invention relates to improvements in welding machines, and more particularly to the type of welding machines generally designated as spot welding machines.

It is an object of the present invention to provide in a device of the above stated character, two series of adjustable electrodes of different sizes which may be selectively arranged to position any one of the electrodes in one series in current transmitting relation to any one of the electrodes in the other series without removal of any parts from the device.

Another object of the invention is the provision of a device particularly adapted for welding appliances used in orthodontia.

A further object of the invention is the provision of independently actuated means for controlling welding temperatures, pressure of the electrodes, and the duration of the welding operation.

Still another object of the invention is the provision in a device of the above stated character of means permitting the attachment of annealing terminals employed in adapting arch wires to plaster models in orthodontia.

Other objects reside in novel combinations and arrangements of parts as will more fully appear in the course of the following description.

Referring now to the drawing in the several views of which like parts have been similarly designated, Figure 1 represents a fragmentary side elevation of the welding device embodying our invention, Figure 2 is a plan view of the welding device shown in Figure 1, Figure 3, an elevation, partially in section, of one of the detachable annealing terminals used in connection with the welding device, Figure 3a is a side elevation of a terminal like that shown in Figure 3, but without a switch.

Figure 4 represents a fragmentary side elevation, partially in section of the welding device, inclusive of the electric circuit employed in its operation, Figure 5 is a side elevation of the device mounted on a standard and in operative connection with a foot pedal pressure control, Figure 6 is a section taken along the line 6—6, Figure 1, Figure 7 is a section taken along the line 7—7, Figure 4, drawn to a reduced scale, Figure 8 is a section taken along the line 8—8, Figure 2, and Figure 9 is a side elevation of an electrode-unit employed in welding arch wires.

The welding device comprises a casing 10 of any suitable design, one side of which, preferably the top, is covered by a removable plate 12 which may be of suitable non-conductive composition. Access to the interior of the casing 10 is provided by removal of the plate 12.

Fixedly supported on plate 12 is a conductive column 13 of inverted L shape. A second conductive column 14, mounted for reciprocation thru plate 12 is disposed in substantial lengthwise alinement with the extended end of column 13.

A spring-pressed turret-head 15 on the extended end of column 13 is provided with a series of laterally extending electrodes 17. Column 14 is also provided with a spring-pressed turrethead 16 having a series of electrodes 18. The turret-head 16 has a tapered nose 20, and the electrodes 18 are disposed on the tapered surface and extend laterally therefrom.

It has been found advantageous to construct the turret-heads 15 and 16 as well as the electrodes 17 and 18 of copper, but it is to be understood that any good conductive material may be employed. Each turret-head and its electrodes may be of integral construction, but under certain conditions it may be more desirable to make the electrodes as separate units to facilitate replacement and repairs.

The electrodes may be of any preferred form, and in the drawing both the straight and offsettype electrodes have been shown. Grooves 19 in the ends of the electrodes are provided for the reception of wires when the device is used in orthodontia.

Pins 21 and 21a extend from the end of each of the columns 13 and 14 respectively, and engage any one of a series of depressions 22 and 22a in the bearing surface 23 and 23a of the respective turret-heads.

The electrodes on each turret-head are uniformly spaced about the periphery thereof, and the depressions are likewise uniformly spaced upon the bearing surfaces as illustrated in Figure 6. The pins 21 and 21a are so positioned on each of the columns that when they engage the depressions 22 and 22a, one of the electrodes on turret-head 15 is held in axial alinement with one of the electrodes on turret-head 16.

A control switch 24 on plate 12 permits regulation of the operation of a transformer 25 to control the welding temperatures. This control is of a type well-known and in common use in the art and detailed description of same appears unnecessary.

A timing switch 26 closes the electric circuit employed in the operation of the device and controls the duration of the welding operation. It has been found desirable to have a spring-pressed actuator for switch 26, and as illustrated in Figure 8 of the drawings, a removable push pin 27 may be moved by manual pressure, against the resistance of a spring contact 28 to close the circuit, and when the manual pressure is removed, the pin 27 is moved by the spring 28 to a circuit opening position.

The push pin 27 may be removed from the position shown in Figure 2 and inserted in an opening 29 as illustrated in the dotted line position in Figure 8, where it closes the switch controlling the circuit for annealing terminals 30 and 31, illustrated in Figure 3.

Both annealing terminals 30 and 31 comprise a shell 32 of suitable insulating composition, and an electrode tip 33 projecting from the shell. The terminal 30 has a push pin switch 34 for closing the electric circuit. The tips 33 are connected by suitable conductors 35 with contact plugs 36 which are inserted in terminal sockets 37 when the terminals are to be used. The tips may be grooved, if desired, for engagement with arch wires in orthodontic work. These grooves are similar to the groove 19 in electrode 17, illustrated in Figure 2 and further description appears unnecessary.

The electrode-unit 38 illustrated in Figure 9 comprises two electrodes 39 supported in a yoke 40. At their upper extremities, the electrodes are in converging relation with their end portions spaced apart, and when desired, the end-portions may also be grooved to receive an arch wire which bridges the gap between the ends. The opposite ends of the electrodes 39 are fitted in the terminal sockets 37 when the unit is in use.

Reciprocation of column 14 may be effected by any suitable mechanism, and as illustrated in Figure 5, the particular means for effecting reciprocation, is a foot pedal 41.

The column 14 is fitted within a sleeve 42 inside casing 10. A coil spring 43 embraces sleeve 42 and is held in place by abutments 44 at opposite ends thereof. A slot 45 extending lengthwise of sleeve 42 provides a guideway for a pin 46 projecting from column 14. The pin 46 overhangs the spring 43. The end of column 14 within the casing 10 terminates in an apertured lug 47.

A rod 48 connects the lug 47 with foot pedal 41, and whenever pressure is applied to the pedal, the pin 46 engages coil spring 43 and the column 14 is moved thru the sleeve against the resistance of the spring. In this manner, the turret-heads 15 and 16 are separated sufficiently to permit adjustment. When pressure is removed from pedal 41, the spring returns column 14 to its normal position, as illustrated in Figures 1 and 4.

Suitable conductors 49 and 50 connect the inner ends of columns 13 and 14 with the transformer 25, which is connected by a conductive cable 51 with a suitable source of electricity 52.

After the turret-heads 15 and 16 have been separated as explained hereinabove, each turret-head may be pulled away from its supporting column and rotated to selectively position any one of the electrodes in working position. When in this position, the pin 21 or 21a will engage one of the depressions 22 or 22a and upon release of the turret-head, its spring will return it to its normal position, illustrated in Figure 4.

By the above adjustment, it is possible to position any one of the electrodes 17 in working relation to any one of the electrodes 18.

The circuit for the device, as illustrated in Figure 4 comprises a transformer 25, having its primary coil connected by suitable conductors with a suitable source of electricity 52. The switch 26 closes the circuit between the source 52 and the transformer 25. The secondary coil of transformer 25 is connected by suitable conductors with the conductive columns 13 and 14, and also with the terminal sockets 37.

In the operation of the device, the foot pedal 41 is depressed, and the turret-heads 15 and 16 are manually rotated until the selected electrodes are brought into operative alinement. The work is inserted between the electrodes, and pressure on the work is regulated by actuation of the foot pedal. The temperature control 24 is regulated as desired, and the circuit is closed by depressing push pin 27. When the desired welding operation is completed, pressure on push pin 27 is released and the circuit is again opened as hereinabove explained.

If the annealing terminals 30 and 31 are to be used, the turret-heads 15 and 16 are separated and maintained in separated relation by turning one of the turret heads to a position in which its electrodes are out of engagement with the electrodes of the other turret-head.

The contact plugs 36 are inserted in terminal sockets 37, the terminals 30 and 31 are applied to the work and the circuit is closed and opened by actuation of switch 34.

When the electrode-unit 38 is to be used, the unit is fitted in terminal sockets 37, and the work is placed across the exposed ends to bridge the gap between the same. The push pin 27 is inserted in opening 29, where it maintains the circuit continuously closed. One of the annealing terminals 30 or any other suitable tool may be employed to contact the work and effect the necessary welding.

Providing the grooves in the electrodes to receive the work, renders the device and attachments particularly effective for orthodontia. The operator is free to use both hands in effecting the welding, as the work is retained in the grooves without further manipulation.

Changes and modifications may be availed of within the spirit and scope of the invention as defined in the hereunto appended claims.

What we claim and desire to secure by Letters Patent is:

1. Welding apparatus comprising two supports, a turret-head on each support, a series of electrodes on each turret-head, the turret-heads being disposed on their respective supports with an electrode on one turret-head in alinement with an electrode on the other turret-head, and pressure means normally holding the alined electrodes in engagement.

2. Welding apparatus comprising two supports, a turret-head on each support, a series of electrodes on each turret-head, the turret-heads being disposed on their respective supports with an electrode on one turret-head in alinement with an electrode on the other turret-head, and means for moving the electrodes into and out of engagement.

3. Welding apparatus comprising two supports, a turret-head mounted for rotary adjustment on each support, a series of electrodes on each turret-head, the turret-heads being disposed on their respective supports with an electrode on one turret-head in alinement with an electrode on the other turret-head, means for holding the turret-heads in adjusted positions and pressure means normally holding the alined electrodes in engagement.

4. Welding apparatus comprising two supports, a turret-head mounted for rotary adjustment on each support and for axial movement relative thereto, a series of electrodes on each turret-head, the turret-heads being disposed on their respective supports with an electrode on one turrethead in alinement with an electrode on the other turret-head, means releasable by an axial movement of each turret-head relative to its support for holding it in adjusted positions and pressure means normally holding the alined electrodes in engagement.

5. Welding apparatus comprising two supports, a turret-head on each support, a series of electrodes on each turret-head, the turret-heads being disposed on their respective supports with an electrode on one turret-head in lengthwise alinement with an electrode on the other turret-head, and pressure means normally holding the alined electrodes in engagement.

6. Welding apparatus comprising a fixed support, a movable support, a turret-head on each support, a series of electrodes on each turret-head, the turret-heads being disposed on their respective supports with an electrode on one turret-head in alinement with an electrode on the other turret-head, a spring on the movable support normally holding the alined electrodes in engagement, and means for moving the latter support against the resistance of its spring to thereby separate the electrodes.

7. In welding apparatus, a support, a spring-pressed turret-head on the support, an electrode on the turret-head, and a pin projecting from the bearing surface of the support, there being a depression in the bearing surface of the turret-head to receive the pin, and the pin being held in engagement with the depression by pressure of the spring urging the turret-head toward the support, to thereby maintain the electrode in a determinate position.

8. In welding apparatus, a support, a spring-pressed turret-head on the support and mounted for rotary and axial movement relative thereto, an electrode on the turret-head, and a pin projecting from the bearing surface of the support, there being a series of depressions in the bearing surface of the turret-head, the pin engaging the respective depressions during rotation of the turret-head, and being held in selective positions by pressure of the spring urging the turret-head toward the support.

9. In welding apparatus, an apertured casing, and an electrode support movably fitted in the aperture of the casing and comprising a slotted sleeve suspended from the casing within the same, abutments at opposite ends of the sleeve, a coil spring on the sleeve between the abutments, a column slidably fitted in the sleeve and extending through the aperture in the casing, a pin on the column movable in the slot and overhanging the spring, an electrode on the exposed end of the column, and means for moving the column against the resistance of the spring, to thereby move the electrode to selected positions.

10. In welding apparatus, an apertured casing, and an electrode support movably fitted in the aperture of the casing and comprising a slotted sleeve suspended from the casing within the same, abutments at opposite ends of the sleeve, a coil spring on the sleeve between the abutments, a column slidably fitted in the sleeve and extending through the aperture in the casing, a pin on the column movable in the slot and overhanging the spring, an electrode on the exposed end of the column, and manually operable means for moving the column against the resistance of the spring, to thereby move the electrode to selected positions.

11. A welding device comprising two conductive supports, a conductive turret-head on each support, a series of electrodes on each turret-head, the turret-heads being disposed on their respective supports with an electrode on one turret-head in current-transmitting relation to an electrode on the other turret-head, and an electric circuit in which the respective supports are connected.

12. A welding device comprising two conductive supports, one of said supports being movable relative to the other, a conductive turret-head on each support, a series of electrodes on each turret-head, the turret-heads being disposed on their respective supports with an electrode on one turret-head normally in current-transmitting relation to an electrode on the other turret-head, an electric circuit in which the respective supports are connected, and means for moving the movable support to thereby separate the electrodes.

13. Welding apparatus comprising a casing, a support of inverted L shape fixedly mounted on the casing, a second support mounted for reciprocation in the casing and having one of its ends projecting through the casing, a turret-head on the L shaped support having its axis of rotation at substantially a right angle to the lengthwise axis of the reciprocating support, a turret-head on the projecting end of the reciprocating support having its axis of rotation at an acute angle to the lengthwise axis of the support, a series of radially disposed electrodes on the first-mentioned turret-head, and a series of electrodes on the other turret-head projecting outwardly therefrom at an acute angle to its axis of rotation, whereby during rotation of the respective turret-heads, two of the electrodes are brought into lengthwise alinement.

14. Welding apparatus comprising a casing, a support of inverted L shape fixedly mounted on the casing, a second support mounted for reciprocation in the casing and having one of its ends projecting through the casing, a turret-head on the L shaped support having its axis of rotation at substantially a right angle to the lengthwise axis of the reciprocating support, a turret-head on the projecting end of the reciprocating support having its axis of rotation at an acute angle to the lengthwise axis of the support, a series of radially disposed electrodes on the first-mentioned turret-head, and a series of electrodes on the other turret-head projecting outwardly therefrom at an acute angle to its axis of rotation, whereby during rotation of the respective turret-heads, two of the electrodes are brought into lengthwise alinement in engaging relation.

15. Welding apparatus comprising a casing, a support of inverted L shape fixedly mounted on the casing, a second support mounted for reciprocation in the casing and having one of its ends projecting through the casing, a turret-head on the L shaped support having its axis of rotation at substantially a right angle to the lengthwise axis of the reciprocating support, a turret-head on the projecting end of the reciprocating support having its axis of rotation at an acute angle to the lengthwise axis of the support, a series of radially disposed electrodes on the first-mentioned turret-head, a series of electrodes on the other turret-head projecting outwardly therefrom at an acute angle to its axis of rotation, whereby during rotation of the respective turret-heads, two of the electrodes are brought into lengthwise alinement, and means for locking the turrets with the eletcrodes in the alined position.

ARCHIE B. BRUSSE.
JOSEPH L. CARMAN.